United States Patent
Ohlsson et al.

(10) Patent No.: US 10,805,795 B2
(45) Date of Patent: Oct. 13, 2020

(54) RADIO ACCESS NODES AND TERMINAL DEVICES IN A COMMUNICATION NETWORK

(71) Applicant: Telefonaktiebolaget LM Ericsson (publ), Stockholm (SE)

(72) Inventors: Oscar Ohlsson, Stockholm (SE); Karl Norrman, Stockholm (SE); Paul Schliwa-Bertling, Ljungsbro (SE); Magnus Stattin, Upplands Väsby (SE)

(73) Assignee: Telefonaktiebolaget LM Ericsson (Publ) (SE)

( * ) Notice: Subject to any disclaimer, the term of this patent is extended or adjusted under 35 U.S.C. 154(b) by 0 days.

(21) Appl. No.: 15/759,087

(22) PCT Filed: Aug. 4, 2016

(86) PCT No.: PCT/SE2016/050738
§ 371 (c)(1),
(2) Date: Mar. 9, 2018

(87) PCT Pub. No.: WO2017/048170
PCT Pub. Date: Mar. 23, 2017

(65) Prior Publication Data
US 2019/0052607 A1    Feb. 14, 2019

Related U.S. Application Data

(60) Provisional application No. 62/218,166, filed on Sep. 14, 2015.

(51) Int. Cl.
*H04W 12/04*  (2009.01)
*H04W 76/28*  (2018.01)
(Continued)

(52) U.S. Cl.
CPC ..... *H04W 12/0401* (2019.01); *H04L 63/0428* (2013.01); *H04W 52/0251* (2013.01); *H04W 76/28* (2018.02); *H04L 2209/80* (2013.01)

(58) Field of Classification Search
CPC .......... H04L 63/0428; H04L 2209/80; H04W 76/28; H04W 52/0251; H04W 28/12; H04W 12/04; G06F 15/177
See application file for complete search history.

(56) References Cited

U.S. PATENT DOCUMENTS

2013/0260811 A1   10/2013   Rayavarapu
2014/0022990 A1    1/2014   Guo et al.

FOREIGN PATENT DOCUMENTS

CN   1550116 A   11/2004
CN   103517271 A   1/2014
(Continued)

OTHER PUBLICATIONS

International Search Report and Written Opinion dated Oct. 14, 2016 for International Application No. PCT/SE2016/050738 filed on Aug. 4, 2016, consisting of 10-pages.
(Continued)

*Primary Examiner* — Brian F Shaw
(74) *Attorney, Agent, or Firm* — Christopher & Weisberg, P.A.

(57) ABSTRACT

According to an exemplary embodiment, there is provided a method of operating a terminal device. The method includes operating the terminal device in a connected state with respect to the communication network. The method further includes receiving a first signal from a first radio access node in the communication network indicating that the connected state is to be suspended, the first signal including information for use in determining a first key for encrypting data to be sent between the terminal device and one of the first radio
(Continued)

access node and another radio access node in the communication network if the connected state is resumed.

30 Claims, 7 Drawing Sheets

(51) Int. Cl.
*H04L 29/06* (2006.01)
*H04W 52/02* (2009.01)

(56) References Cited

FOREIGN PATENT DOCUMENTS

| EP | 2645804 A1 * | 10/2013 | .......... H04W 76/028 |
|---|---|---|---|
| EP | 2645804 A1 | 10/2013 | |
| EP | 2757856 A1 | 7/2014 | |

OTHER PUBLICATIONS

Sa WG2 Meeting #110-AH S2-152952; Title: "Update to the Signaling reduction for UE state transitions solution"; Source: Ericsson; Document for: Approval; Agenda Item: 6.6; Work Item / Release: FS_AE_CIoT/Rel-13; Location and Date: Sophia-Antipolis, France, Aug. 31, 2015-Sep. 4, 2015, consisting of 8-pages.
International Preliminary Report on Patentability dated Nov. 30, 2017 for International Application No. PCT/SE2016/050738 filed on Aug. 4, 2016, consisting of 23-pages.
3GPP TSG-SA WG3 Meeting #82 S3-160157; Title: "Security for RRC Connection Suspend and Resume procedure in solution 18 for Narrow Band CIoT"; Source: Ericsson; Document for: Discussion; Agenda Item: 7.15; Work Item / Release: NB-IoT/Release 13; Location and Date: Dubrovnik, Croatia Feb. 1-6, 2016, consisting of 7-pages.
3GPP TR 23.720 V13.0.0; 3rd Generation Partnership Project; Technical Specification Group Services and System Aspects; Study on architecture enhancements for Cellular Internet of Things; (Release 13); Mar. 2016, consisting of 94-pages.
3GPP TR 23.720 V0.1.0; 3rd Generation Partnership Project; Technical Specification Group Services and System Aspects; Architecture enhancements for Cellular Internet of Things; (Release 13); Jul. 2015, consisting of 54-pages.
3GPP TS 33.401 V12.14.0; 3rd Generation Partnership Project; Technical Specification Group Services and System Aspects; 3GPP System Architecture Evolution (SAE); Security architecture (Release 12); Mar. 2015, consisting of 131-pages.
3GPP TS 36.331 V12.6.0; 3rd Generation Partnership Project; Technical Specification Group Radio Access Network; Evolved Universal Terrestrial Radio Access (E-UTRA); Radio Resource Control (RRC); Protocol specification (Release 12); Jun. 2015, consisting of 357-pages.
Chinese Office Action and English Translation dated Mar. 27, 2020 for Application No. 201680053097.X, consisting pf 10-pages.
3GPP TR 23.720 V0.2.0; 3rd Generation Partnership Project; Technical Specification Group Services and System Aspects; Architecture enhancements for Cellular Internet of Things; (Release 13); Sep. 2015, consisting of 75-pages.
ETSI TS 133 401 V8.2.1; Digital cellular telecommunications system (Phase 2+);Universal Mobile Telecommunications System (UMTS); LTE; 3GPP System Architecture Evolution (SAE); Security architecture (3GPP TS 33.401 version 8.2.1 Release 8); Jan. 2009, consisting of 60-pages.

\* cited by examiner

US 10,805,795 B2

RADIO ACCESS NODES AND TERMINAL DEVICES IN A COMMUNICATION NETWORK

CROSS-REFERENCE TO RELATED APPLICATIONS

This application is a Submission Under 35 U.S.C. § 371 for U.S. National Stage Patent Application of International Application Number: PCT/SE2016/050738, filed Aug. 4, 2016 entitled "RADIO ACCESS NODES AND TERMINAL DEVICES IN A COMMUNICATION NETWORK," which claims priority to U.S. Provisional Application No. 62/218,166, filed Sep. 14, 2015, the entireties of both which are incorporated herein by reference.

TECHNICAL FIELD

The disclosure relates to radio access nodes and terminal devices in a communication network.

BACKGROUND

In a typical cellular radio system, radio or wireless terminals (also known as mobile stations, user equipments (UEs) or, more generally, terminal devices) communicate via a radio access network (RAN) to one or more core networks. The radio access network (RAN) covers a geographical area which is divided into cell areas, with each cell area being served by a base station, e.g., a radio base station (RBS), which in some networks may also be called, for example, a "NodeB" (in a Universal Mobile Telecommunications System (UMTS) network), "eNodeB" (in a Long Term Evolution (LTE) network), or, more generally, a radio access node. A cell is a geographical area where radio coverage is provided by the radio base station equipment at a base station site. Each cell is identified by an identifier within the local radio area, which is broadcast in the cell. The base stations communicate over the air interface operating on radio frequencies with the user equipment units (UEs) within range of the base stations.

In some radio access networks, several base stations may be connected (e.g., by landlines or microwave) to a radio network controller (RNC), a base station controller (BSC) or a Mobility Management Entity (MME). The radio network controller supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM). Universal Terrestrial Radio Access Network (UTRAN) is essentially a radio access network using wideband code division multiple access (WCDMA) for user equipment units (UEs).

Long Term Evolution (LTE) is a variant of a Third Generation Partnership Project (3GPP) radio access technology where the radio base station nodes are connected to MMEs and Serving Gateways (S-GW) in a core network rather than to radio network controller (RNC) nodes. In general, in LTE the functions of a radio network controller (RNC) node are distributed between the radio base stations nodes (eNodeB's in LTE), MMEs and S-GWs.

A currently popular vision of the future of cellular networks includes machines or other autonomous devices communicating between each other (or with an application server) without human interaction. A typical scenario is to have sensors sending measurements infrequently, where each of the transmissions would consist of only small amounts of data. This type of communication is commonly referred to as machine to machine (M2M) communication or machine-type communication (MTC).

One of the main characteristics of machine-type communication (MTC) is the infrequent transmission of small amounts of data. It is expected that the number of MTC devices will increase exponentially, but the data size per device will remain small. In LTE, the current data transfer procedures are not optimised for small data transfers and short lived sessions, which results in a large signalling overhead.

To handle small data transfers more efficiently, 3GPP is currently studying methods to reduce the signalling overhead when transitioning from RRC (Radio Resource Control) Idle to RRC Connected. One of the proposed solutions is referred to as 'RRC Resume', which is based on re-using the UE context from the previous RRC connection for the subsequent RRC connection setup. This requires the storing of the UE context in the eNB, and by storing the UE context the eNB can avoid the signalling required for security activation and bearer establishment at the next RRC Idle to RRC Connected transition. The term 'RRC Suspended' is also sometimes used to refer to this new state in which the UE has no established RRC connection but the UE context is cached in the or another eNB.

RRC Resume is realised by introducing two new procedures, which are termed 'RRC Suspend' and 'RRC Resume' herein, and which are illustrated by the signalling diagrams in FIGS. 1 and 2 respectively. FIGS. 1 and 2 show the signalling between a UE 2 and an eNB 4. In FIG. 1, the UE 2 is in the RRC Connected state or mode, and is sending data 6 to the eNB 4 in the uplink (UL) and receiving data 8 from the eNB 4 in the downlink (DL). There are several ways or reasons for a UE 2 to need to be transitioned from the RRC Connected state to the RRC Idle state, but one reason can be the expiry of an inactivity timer (i.e. that monitors the time since the last data was transmitted between the UE 2 and eNB 4). Thus, on expiry of an inactivity timer (shown by box 10), the eNB 4 suspends a connection by sending a signal 12 to the UE 2, which is shown as 'RRC Connection Suspend' in FIG. 1. Although not shown in FIG. 1, both the UE 2 and eNB 4 store the UE context for the connection and an associated identifier for the UE 2 (which is referred to herein as a 'Resume ID'). The UE context contains, for example, bearer configuration and security related parameters.

Referring now to FIG. 2, at the next transition from RRC Idle/Suspended to RRC Connected (for example which may occur when the UE 2 has data to send to the eNB 4/communication network), the UE 2 'resumes' the connection by sending a random access preamble 14 to the eNB 4, receives a random access response 16 from the eNB 4 and sends a signal 18 to the eNB 4 requesting that the RRC connection is resumed. This signal 18 is referred to herein as 'RRC Connection Resume Request'. The UE 2 includes the previously received Resume ID in the 'RRC Connection Resume Request' 18, along with an authorization token.

Although not shown in FIG. 2, the eNB 4 uses the Resume ID to retrieve the stored UE context (possibly from another eNB). The authorization token is used by the eNB 4 to securely identify the UE. Assuming the UE context is found and the authorization token is valid, the eNB 4 responds with a signal 20 indicating that the RRC connection has been successfully resumed. This signal 20 is referred to as "RRC Connection Resume Complete" herein. The eNB 4 then activates access stratum (AS) security using the old AS base key, $K_{eNB}$ 22, which, e.g. was used to derive the encryption key that was used for the RRC connection before it was suspended. The UE 2 is now in the RRC Connected state or mode, and can send data 24 to the eNB 4 in the UL and receive data 26 from the eNB 4 in the DL.

The RRC Resume procedure is not necessarily limited to a single (i.e. the same) cell or single (i.e. the same) eNB, but can also be supported across eNBs. Inter-eNB connection resumption is handled using context fetching, whereby the 'resuming eNB' (i.e. the eNB that is going to resume the RRC connection) retrieves the UE context from the 'suspending eNB' (i.e. the eNB that suspended the RRC connection) over the X2 interface (an inter-node interface that eNBs can use to exchange information with each other). The resuming eNB provides the suspending eNB with the Resume ID which is used by the suspending eNB to identify the UE context.

It should be noted that the RRC Connection Suspend, RRC Connection Resume Request and RRC Connection Resume Complete should only be seen as exemplary names for these signals/messages, the names eventually adopted in the by 3GPP in the specifications may be different.

Another optimization being considered in 3GPP is to allow uplink data to be transmitted in the first uplink message, i.e. together with signal 18 (the RRC Connection Resume Request). In this way the number of signals/messages can be reduced even further.

In LTE, user plane data is encrypted between the UE and eNB based on a shared key, the access stratum (AS)-base key $K_{eNB}$. While RRC Resume is not a handover, it can relate to mobility between two eNBs, and hence must provide compartmentalization of $K_{eNB}$:s. In case of a regular LTE X2 handover the compartmentalization is accomplished as follows. The eNB controlling the source cell (i.e. the cell that the UE is in prior to the handover) computes a new AS-base key to be used in the target cell (i.e. the cell that the UE is to be handed-in to). This is important for security as it prevents the same key from being used twice and also enables forward secrecy. The new AS-base key, denoted $K_{eNB}*$, is derived by the UE and the source eNB based on the Physical Cell Identity (PCI) of the target cell, the target frequency and the previous $K_{eNB}$. Instead of using $K_{eNB}$, the derivation of $K_{eNB}*$ can also be based on a Next Hop (NH) parameter, which is a special value provided by the MME to the source eNB. This type of derivation (referred to as vertical derivation) is preferred but requires that a fresh (unused) NH value is available in the source eNB. If no fresh NH is available then the $K_{eNB}*$ derivation is referred to as horizontal derivation and is based on $K_{eNB}$.

SUMMARY

If a new $K_{eNB}$ is derived in a similar fashion when a UE is suspended by the eNB for later RRC Resume, an ambiguous situation arises if data is transmitted in the first uplink message in RRC Resume. In particular, if the type of key derivation has not been agreed beforehand, the UE and the eNB resuming the connection may end up with different $K_{eNB}*$ which results in failed decryption of the uplink data. The same problem also arises if the UE uses a different encryption algorithm than the resuming eNB, or an algorithm not supported by the resuming eNB.

Similarly, if the UE is suspended in one cell, and later resumes in another, the same ambiguity can occur. The reason for this is that the eNB suspending the UE cannot provide the same base key to the eNB with which the UE resumes the connection which would break the compartmentalization principle for keys in LTE.

Therefore there is a need for improvements to the proposed RRC Resume procedure to avoid some or all of the disadvantages set out above.

According to a first aspect, there is provided a method of operating a terminal device. The method comprises operating the terminal device in a connected state with respect to the communication network; and receiving a first signal from a first radio access node in the communication network indicating that the connected state is to be suspended, the first signal comprising information for use in determining a first key for encrypting data to be sent between the terminal device and the first radio access node or another radio access node in the communication network if the connected state is resumed.

According to a second aspect, there is provided a computer program product comprising a computer readable medium having computer readable code embodied therein, the computer readable code being configured such that, on execution by a suitable computer or processor, the computer or processor is caused to perform the method described above.

According to a third aspect, there is provided a terminal device. The terminal device is adapted to operate in a connected state with respect to the communication network; and receive a first signal from a first radio access node in the communication network indicating that the connected state is to be suspended, the first signal comprising information for use in determining a first key for encrypting data to be sent between the terminal device and the first radio access node or another radio access node in the communication network if the connected state is resumed.

According to a fourth aspect, there is provided another terminal device. The terminal device comprises a processor and a memory, said memory containing instructions executable by said processor whereby said terminal device is operative to operate in a connected state with respect to the communication network; and receive a first signal from a first radio access node in the communication network indicating that the connected state is to be suspended, the first signal comprising information for use in determining a first key for encrypting data to be sent between the terminal device and the first radio access node or another radio access node in the communication network if the connected state is resumed.

According to a fifth aspect, there is provided another terminal device. The terminal device comprises a first module configured to operate the terminal device in a connected state with respect to the communication network; and a second module configured to receive a first signal from a first radio access node in the communication network indicating that the connected state is to be suspended, the first signal comprising information for use in determining a first key for encrypting data to be sent between the terminal device and the first radio access node or another radio access node in the communication network if the connected state is resumed.

According to a sixth aspect, there is provided a method of operating a first radio access node in a communication network. The method comprises sending a first signal to a terminal device that is in a connected state with respect to the communication network, the first signal indicating that the connected state is to be suspended, the first signal comprising information for use by the terminal device in determining a first key for encrypting data to be sent between the terminal device and the first radio access node or another radio access node in the communication network if the connected state is resumed.

According to a seventh aspect, there is provided a computer program product comprising a computer readable medium having computer readable code embodied therein, the computer readable code being configured such that, on execution by a suitable computer or processor, the computer or processor is caused to perform the method described above.

According to an eighth aspect, there is provided a first radio access node for use in a communication network. The first radio access node is adapted to send a first signal to a terminal device that is in a connected state with respect to the communication network, the first signal indicating that the connected state is to be suspended, the first signal comprising information for use by the terminal device in determining a first key for encrypting data to be sent between the terminal device and the first radio access node or another radio access node in the communication network if the connected state is resumed.

According to a ninth aspect, there is provided a first radio access node for use in a communication network. The first radio access node comprises a processor and a memory, said memory containing instructions executable by said processor whereby said first radio access node is operative to send a first signal to a terminal device that is in a connected state with respect to the communication network, the first signal indicating that the connected state is to be suspended, the first signal comprising information for use by the terminal device in determining a first key for encrypting data to be sent between the terminal device and the first radio access node or another radio access node in the communication network if the connected state is resumed.

According to a tenth aspect, there is provided a first radio access node for use in a communication network. The first radio access node comprises a first module configured to send a first signal to a terminal device that is in a connected state with respect to the communication network, the first signal indicating that the connected state is to be suspended, the first signal comprising information for use by the terminal device in determining a first key for encrypting data to be sent between the terminal device and the first radio access node or another radio access node in the communication network if the connected state is resumed.

According to an eleventh aspect, there is provided a method of operating a second radio access node in a communication network. The method comprises receiving a first signal from a terminal device that has had a connected state with respect to the communication network suspended, the first signal requesting the resumption of the connected state; sending a second signal to a first radio access node to request context information relating to the connected state of the terminal device with the communication network; and receiving a third signal from the first radio access node, the third signal comprising the context information and a first key for encrypting data to be sent between the terminal device and the second radio access node on resumption of the connected state.

According to a twelfth aspect, there is provided a computer program product comprising a computer readable medium having computer readable code embodied therein, the computer readable code being configured such that, on execution by a suitable computer or processor, the computer or processor is caused to perform the method described above.

According to a thirteenth aspect, there is provided a second radio access node for use in a communication network. The second radio access node is adapted to receive a first signal from a terminal device that has had a connected state with respect to the communication network suspended, the first signal requesting the resumption of the connected state; send a second signal to a first radio access node to request context information relating to the connected state of the terminal device with the communication network; and receive a third signal from the first radio access node, the third signal comprising the context information and a first key for encrypting data to be sent between the terminal device and the second radio access node on resumption of the connected state.

According to a fourteenth aspect, there is provided a second radio access node for use in a communication network. The second radio access node comprises a processor and a memory, said memory containing instructions executable by said processor whereby said second radio access node is operative to receive a first signal from a terminal device that has had a connected state with respect to the communication network suspended, the first signal requesting the resumption of the connected state; send a second signal to a first radio access node to request context information relating to the connected state of the terminal device with the communication network; and receive a third signal from the first radio access node, the third signal comprising the context information and a first key for encrypting data to be sent between the terminal device and the second radio access node on resumption of the connected state.

According to a fifteenth aspect, there is provided a second radio access node for use in a communication network. The second radio access node comprises a first module for receiving a first signal from a terminal device that has had a connected state with respect to the communication network suspended, the first signal requesting the resumption of the connected state; a second module for sending a second signal to a first radio access node to request context information relating to the connected state of the terminal device with the communication network; and a third module for receiving a third signal from the first radio access node, the third signal comprising the context information and a first key for encrypting data to be sent between the terminal device and the second radio access node on resumption of the connected state.

Thus, the techniques described herein allow instant data transfer (e.g. in the initial L3 message of the random access procedure in LTE). Instant data transfer reduces delay and the number of messages that need to be exchanged over the air interface, particularly in the case of MTC devices where only a small amount of data may need to be transmitted at any given time. The techniques described herein also avoid the need to send data in clear text (i.e. unencrypted), which would violate the LTE security model, or to delay the sending of data until security parameters have been provided as part of the resume procedure.

BRIEF DESCRIPTION OF THE DRAWINGS

Features, objects and advantages of the presently disclosed techniques will become apparent to those skilled in the art by reading the following detailed description where references will be made to the appended figures in which.

DETAILED DESCRIPTION

Figure 1:
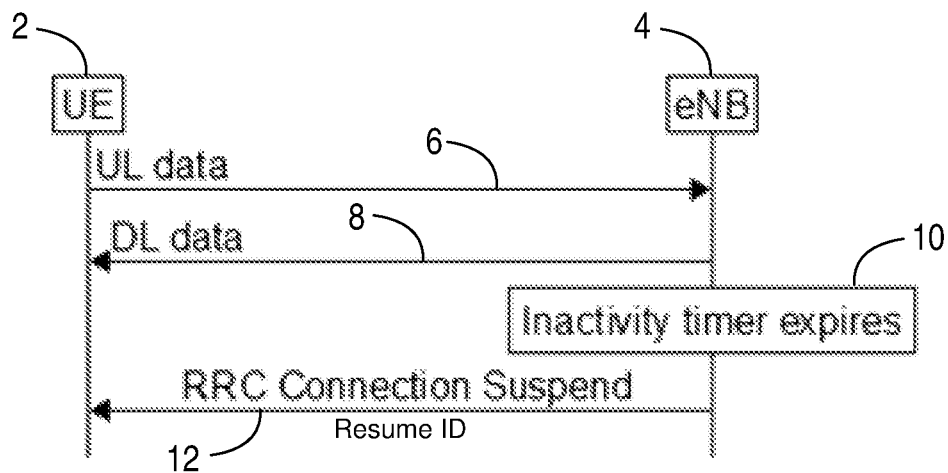
FIG. 1 illustrates the signalling in a connection suspension procedure.

The following sets forth specific details, such as particular embodiments for purposes of explanation and not limitation. But it will be appreciated by one skilled in the art that other embodiments may be employed apart from these specific details. In some instances, detailed descriptions of well known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing units, one or more processing modules or one or more controllers, and the terms computer, processor, processing unit, processing module and controller may be employed interchangeably. When provided by a computer, processor, processing unit, processing module or controller, the functions may be provided by a single dedicated computer, processor, processing unit, processing module or controller, by a single shared computer, processor, processing unit, processing module or controller, or by a plurality of individual computers, processors, processing units, processing modules or controllers, some of which may be shared or distributed. Moreover, these terms also refer to other hardware capable of performing such functions and/or executing software, such as the example hardware recited above.

Although in the description below the term user equipment (UE) is used, it should be understood by the skilled in the art that "UE" is a non-limiting term comprising any mobile or wireless device or node equipped with a radio interface allowing for at least one of: transmitting signals in uplink (UL) and receiving and/or measuring signals in downlink (DL). A UE herein may comprise a UE (in its general sense) capable of operating or at least performing measurements in one or more frequencies, carrier frequencies, component carriers or frequency bands. It may be a "UE" operating in single- or multi-radio access technology (RAT) or multi-standard mode. As well as "UE", the terms "mobile device" and "terminal device" may be used interchangeably in the following description, and it will be appreciated that such a device, particularly a MTC device, does not necessarily have to be 'mobile' in the sense that it is carried by a user. Instead, the terms "mobile device" and "terminal device" encompass any device that is capable of communicating with communication networks that operate according to one or more mobile communication standards, such as the Global System for Mobile communications, GSM, UMTS, Long-Term Evolution, LTE, etc.

A cell is associated with a base station, where a base station comprises in a general sense any network node transmitting radio signals in the downlink and/or receiving radio signals in the uplink. Some example base stations, or terms used for describing base stations, are eNodeB, eNB, NodeB, macro/micro/pico/femto radio base station, home eNodeB (also known as femto base station), relay, repeater, sensor, transmitting-only radio nodes or receiving-only radio nodes. A base station may operate or at least perform measurements in one or more frequencies, carrier frequencies or frequency bands and may be capable of carrier aggregation. It may also be a single-radio access technology (RAT), multi-RAT, or multi-standard node, e.g., using the same or different base band modules for different RATs.

It should be noted that use of the term "radio access node" as used herein can refer to a base station, such as an eNodeB, or a network node in the radio access network (RAN) responsible for resource management, such as a radio network controller (RNC).

Unless otherwise indicated herein, the signalling described is either via direct links or logical links (e.g. via higher layer protocols and/or via one or more network nodes).

Figure 3:
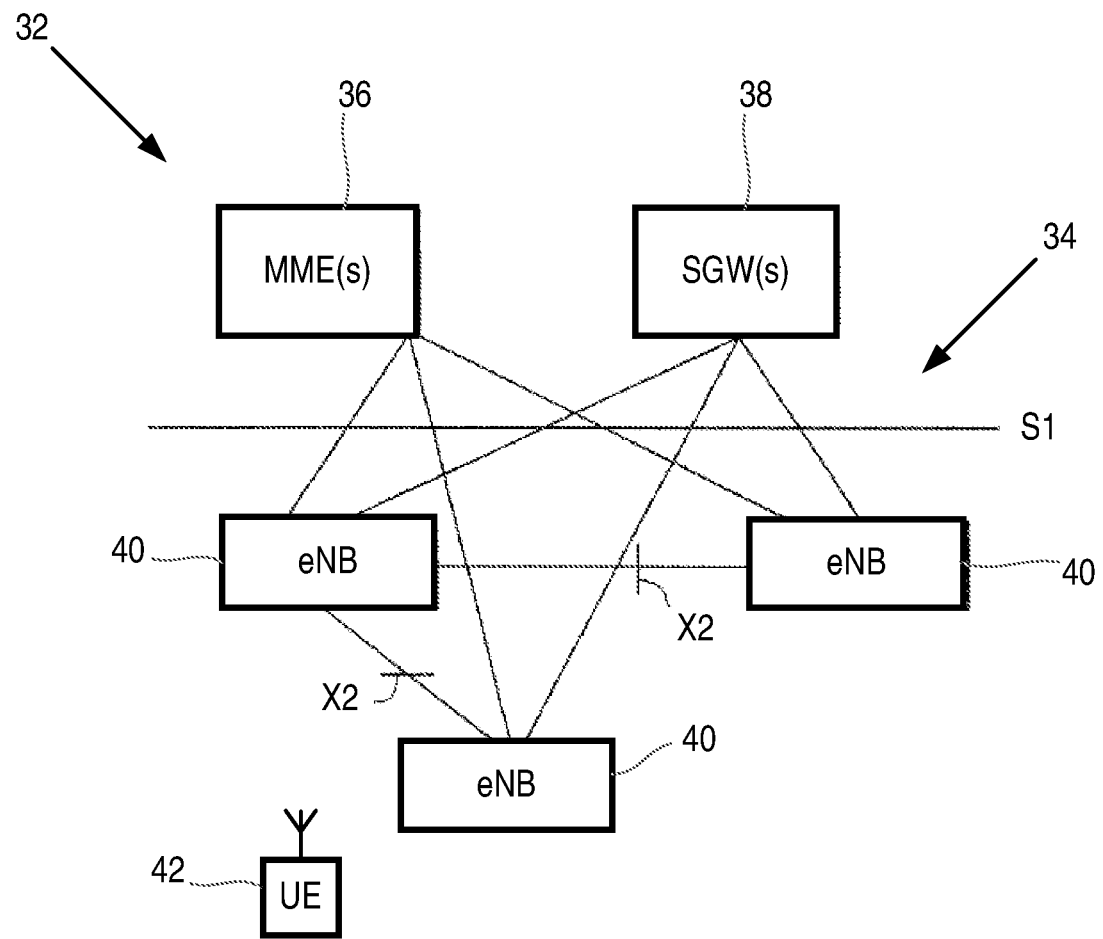
FIG. 3 illustrates an exemplary LTE network.

FIG. 3 shows an example diagram of an evolved UMTS Terrestrial Radio Access Network (E-UTRAN) architecture as part of an LTE-based communications system 32 to which the techniques described herein can be applied. Nodes in a core network 34 part of the system 32 include one or more Mobility Management Entities (MMEs) 36, a key control node for the LTE access network, and one or more Serving Gateways (SGWs) 38 which route and forward user data packets while acting as a mobility anchor. They communicate with base stations or radio access nodes 40 referred to in LTE as eNBs, over an interface, for example an S1 interface. The eNBs 40 can include the same or different categories of eNBs, e.g. macro eNBs, and/or micro/pico/ femto eNBs. The eNBs 40 communicate with each other over an inter-node interface, for example an X2 interface. The S1 interface and X2 interface are defined in the LTE standard. A UE 42 is shown, and a UE 42 can receive downlink data from and send uplink data to one of the base stations 40, with that base station 40 being referred to as the serving base station of the UE 42.

Figure 4:
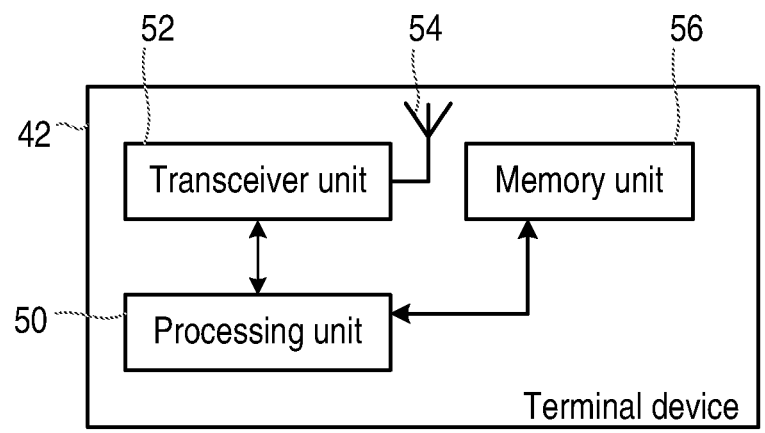
FIG. 4 is a block diagram of a terminal device according to an embodiment.

FIG. 4 shows a terminal device (UE) 42 that can be adapted or configured to operate according to one or more of the non-limiting example embodiments described. The UE 42 comprises a processor or processing unit 50 that controls the operation of the UE 42. The processing unit 50 is connected to a transceiver unit 52 (which comprises a receiver and a transmitter) with associated antenna(s) 54 which are used to transmit signals to and receive signals from a radio access node 40 in the network 32. The UE 42 also comprises a memory or memory unit 56 that is connected to the processing unit 50 and that contains instructions or computer code executable by the processing unit 50 and other information or data required for the operation of the UE 42.

Figure 5:
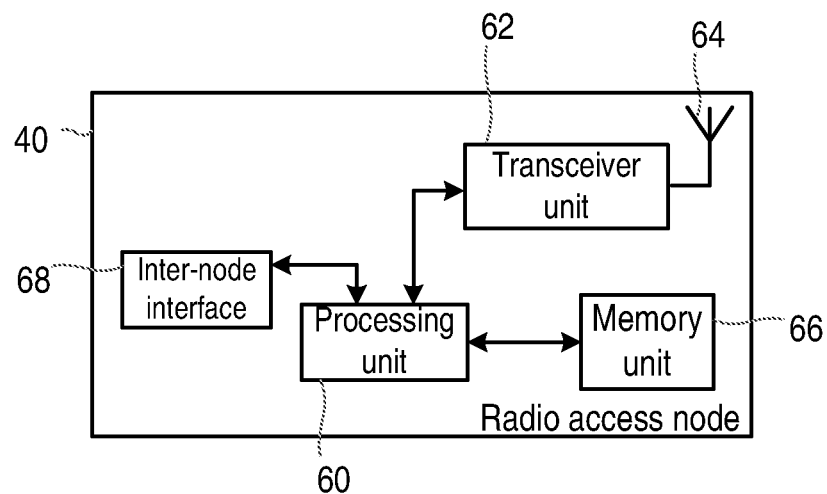
FIG. 5 is a block diagram of a radio access node according to an embodiment.

FIG. 5 shows a radio access node (for example a cellular network base station such as a NodeB or an eNodeB) that can be adapted or configured to operate according to the example embodiments described. The radio access node 40 comprises a processor or processing unit 60 that controls the operation of the radio access node 40. The processing unit 60 is connected to a transceiver unit 62 (which comprises a receiver and a transmitter) with associated antenna(s) 64 which are used to transmit signals to, and receive signals from, UEs 42 in the network 32. The radio access node 40 also comprises a memory or memory unit 66 that is connected to the processing unit 60 and that contains instructions or computer code executable by the processing unit 60 and other information or data required for the operation of the radio access node 40. The radio access node 40 also includes components and/or circuitry 68 for allowing the radio access node 40 to exchange information with another radio access node 40 (for example via an X2 interface), and/or with a core network node 36, 38 (for example via an S1 interface). It will be appreciated that base stations for use in other types of network (e.g. UTRAN or WCDMA RAN) will include similar components to those shown in FIG. 5 and appropriate interface circuitry 68 for enabling communications with the other radio access nodes in those types of networks (e.g. other base stations, mobility management nodes and/or nodes in the core network).

It will be appreciated that only the components of the UE 42 and radio access node 40 required to explain the embodiments presented herein are illustrated in FIGS. 4 and 5.

Although the embodiments of the present disclosure will mainly be described in the context of LTE, it will be appreciated by those skilled in the art that the problems and solutions described herein are equally applicable to other types of wireless access networks and user equipments (UEs) implementing other access technologies and standards, and thus LTE (and the other LTE specific terminology used herein) should only be seen as examples of the technologies to which the techniques can be applied.

Figure 2:
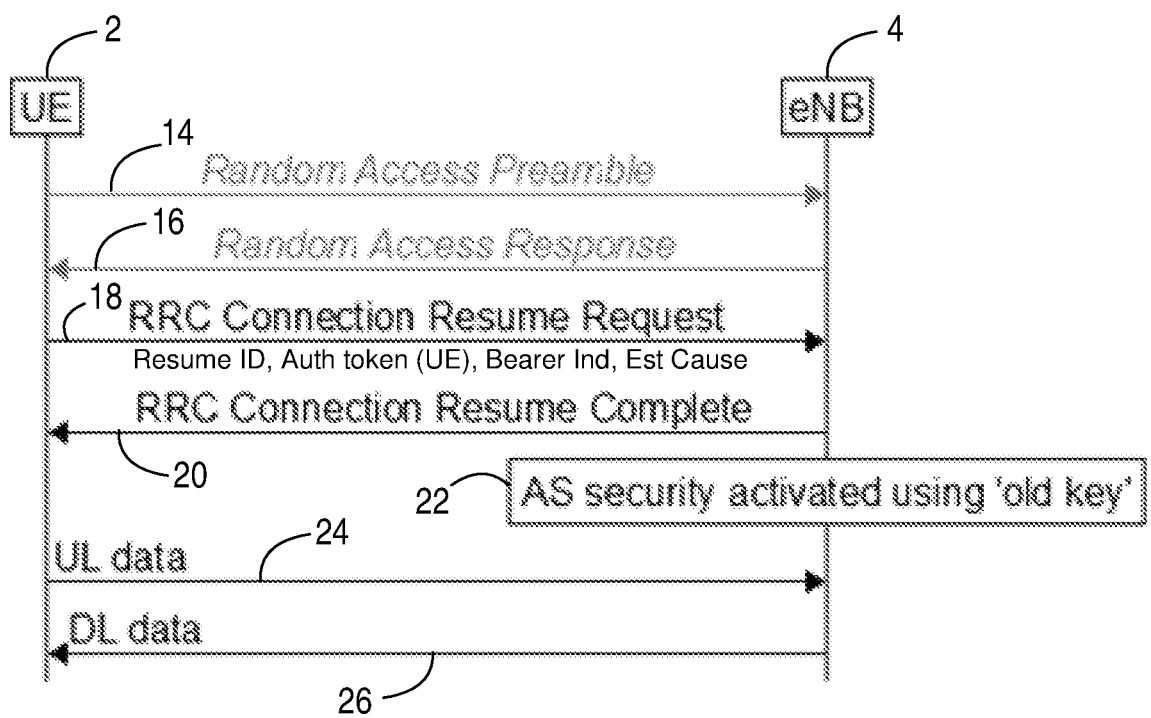
FIG. 2 illustrate the signalling in a connection resumption procedure.

As noted above, when resuming an RRC connection it is desirable to be able to send uplink data to the eNB in the first uplink message, i.e. together with the request to resume the RRC connection (e.g. with signal 18 in FIG. 2). However, in LTE data is to be encrypted using a shared encryption key, derived from the AS base key $K_{eNB}$, and if a new AS base key $K_{eNB}$ (for use when resuming the connection) is derived when a UE is suspended by the eNB for later RRC Resume, an ambiguous situation arises if data is transmitted in the first uplink message in RRC Resume if the type of key derivation has not been agreed beforehand and/or if the UE uses a different encryption algorithm than the resuming eNB, or an encryption algorithm that is not supported by the resuming eNB. Likewise in the event that a UE is suspended in one cell and later resumes in another, the same ambiguity can occur as the eNB suspending the UE cannot provide the same base key to the eNB with which the UE resumes the connection since this would break the compartmentalization principle for keys in LTE.

Therefore, according to a specific exemplary technique, to enable an eNB hosting the cell in which the UE will resume a connection to decrypt uplink data contained in a request to resume the connection (e.g. in the first uplink medium access control (MAC)-frame together with the RRC Connection Resume Request), the eNB suspending the UE indicates to the UE information (e.g. key derivation parameters) for use in determining an AS base key from which encryption keys for encrypting data to be sent between the UE and resuming eNB can be derived, which allows the UE to compute the correct AS base key for use with the cell in which the connection is to be resumed (and for the resuming eNB to compute the correct AS base key). In some exemplary embodiments the eNB suspending the UE can further indicate the access stratum (AS) security algorithm to use when the connection is suspended. When the UE later resumes the connection in a new cell, the eNB that suspended the UE provides the eNB with which the UE resumes the connection with the correct AS base key and indicates the correct AS security algorithm. The AS security algorithm could be an encryption algorithm, an integrity algorithm; the indication may also refer to an indication of one algorithm of each type.

As used herein, the term 'suspending eNB' refers to the eNB that suspends, or initiates suspension of, the RRC connection with the UE, and the term 'resuming eNB' refers to the eNB that resumes the RRC connection with the UE.

Figure 6:
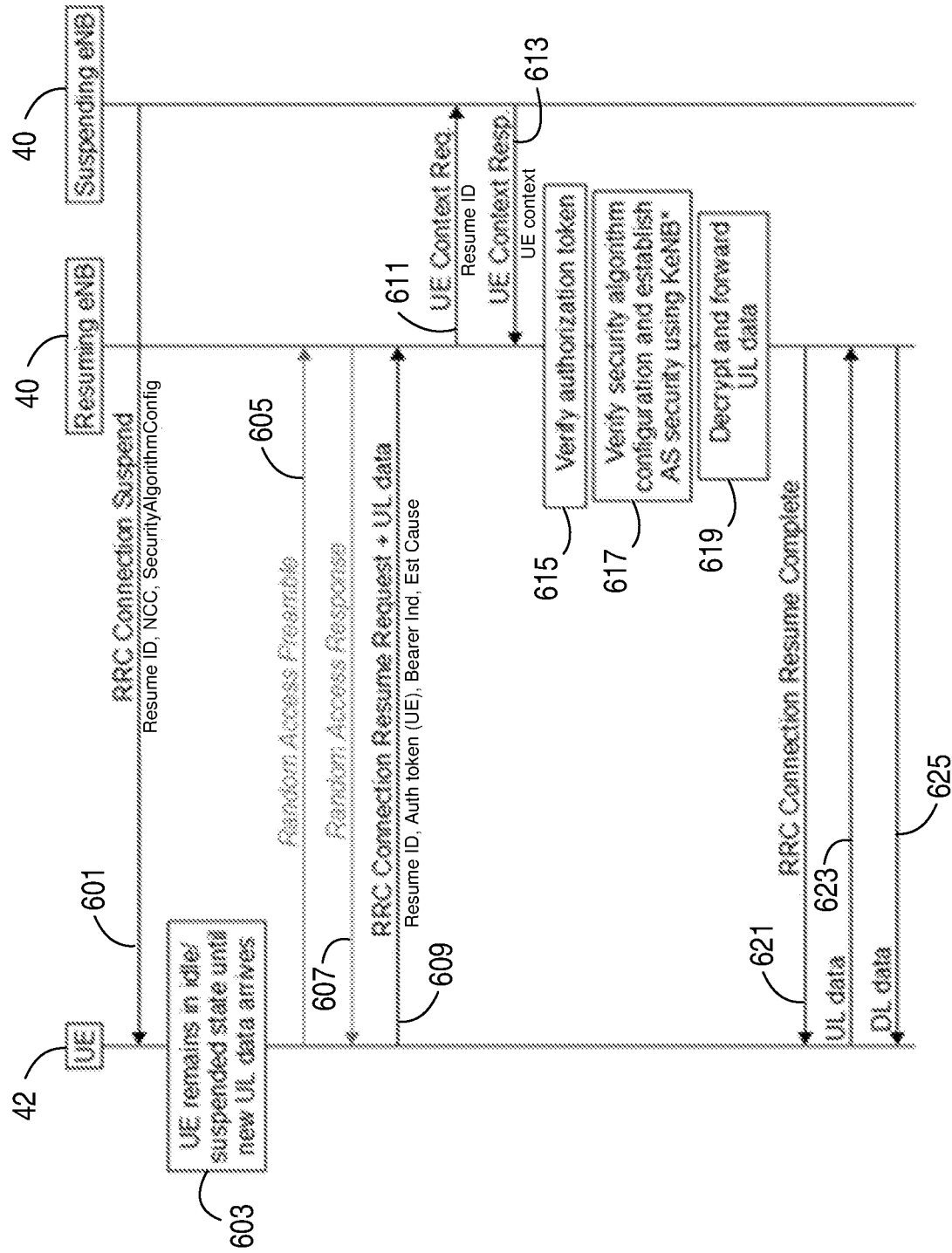
FIG. 6 is a signalling diagram illustrating the signalling in a first exemplary embodiment.

The signalling diagram in FIG. 6 illustrates the exemplary suspension and resumption of an RRC connection according to the techniques described herein. The signalling in FIG. 6 provides 'instant' uplink data transfer in the sense that UL data can be sent with the request to resume the RRC connection.

FIG. 6 illustrates the signalling between a UE 42, a suspending eNB 40 and a resuming eNB 40, and thus it is assumed that the resuming eNB and the suspending eNB are different eNBs. However, it is possible that the UE may resume the connection with the same eNB, and the variation to the signalling shown in FIG. 6 required to deal with this scenario is described in more detail below.

Initially, the UE 42 has an established RRC connection with an eNB 40 (the eNB labelled in FIG. 6 as the suspending eNB). Due to some trigger, e.g. expiry of a UE inactivity timer, the suspending eNB 40 decides to suspend the RRC connection by sending a signal 601 to the UE (labelled an 'RRC Connection Suspend' message).

In addition to the Resume ID, the message 601 also contains the Next Hop Chaining Counter, NCC (a parameter that is used in the derivation of $K_{eNB}^*$) and the security algorithm configuration to be used in the resumption cell.

Upon receipt of the signal/message 601, the UE 42 stores the related UE context (i.e. the UE context relating to the RRC connection to be suspended) as well as the NCC and security algorithm configuration indicated in message 601, and the UE enters an RRC Idle or suspended state (indicated by box 603).

NCC is an existing parameter in LTE that indicates the number of vertical key derivations that has been performed since the initial $K_{eNB}$. Since a fresh (unused) Next Hop, NH, value (an 'intermediate key' parameter that is used in the derivation of the AS base key, $K_{eNB}*$) is used for every vertical key derivation there is a one-to-one mapping between NH and NCC (the only exception is NCC=0 which is mapped to the initial $K_{eNB}$). Furthermore, since all $K_{eNB}$:s are originally derived from either the initial $K_{eNB}$ or an NH, each $K_{eNB}$ is also uniquely associated with an NCC (however the reverse is not true).

The value of the NCC included in RRC Connection Suspend message 601 depends on how the UE should derive the $K_{eNB}*$. If an unused {NH, NCC} pair is available in the suspending eNB 40, the eNB (and later the UE) will derive the $K_{eNB}*$ from NH (this is vertical key derivation), otherwise if no unused {NH, NCC} pair is available in the eNB, the UE and resuming eNB derive the $K_{eNB}*$ from the current $K_{eNB}$ (this is horizontal key derivation). In the former case the NCC associated with the NH is sent to the UE in message 601, and in the latter case the NCC associated with the current $K_{eNB}$ is sent to the UE in message 601.

It should be noted that the actual derivation of $K_{eNB}*$ is not performed at this stage of the process, but later when the parameters of the cell in which the connection is to be resumed are known (namely the Physical cell ID (PCI) and downlink EUTRA Absolute Radio-frequency Channel Number (EARFCN-DL) is known).

Thus, after suspension of the RRC connection, at some later point in time new data arrives in the UL buffer at the UE 42. This triggers the UE to resume the RRC connection by sending a random access preamble 605 to a resuming eNB (i.e. the eNB that the UE would like to resume the RRC connection with), receiving a random access response 607 and then sending a connection resumption request 609 ('RRC connection resume request') along with the encrypted uplink data to the resuming eNB. The UE 42 includes its Resume ID and an authorization token in the RRC connection resume request. In some embodiments, particularly where the resuming eNB (or resuming cell) is different to the suspending eNB (or suspending cell), the UE 42 can also include an identifier of the suspending eNB (or suspending cell) in the RRC connection resume request. The uplink data is encrypted using the new AS base key $K_{eNB}*$ derived using the NCC and the security algorithm configuration indicated in signal 601.

In particular, the new AS base key $K_{eNB}*$ is derived as follows. If the NCC value the UE received in the 'RRC Connection Suspend' message 601 from the suspending eNB is equal to the NCC value associated with the currently active $K_{eNB}$, then the UE derives $K_{eNB}*$ from the currently active $K_{eNB}$ and the resuming cell's PCI and its frequency EARFCN-DL. However, if the UE received an NCC value that was different from the NCC associated with the currently active $K_{eNB}$, then the UE first computes the Next Hop (NH) parameter corresponding to the NCC, and then derives $K_{eNB}*$ from NH and the resuming cell's PCI and its frequency EARFCN-DL.

On receipt of the message 609, the resuming eNB 40 extracts the Resume ID and sends a request 611 to the suspending eNB 40 to retrieve the associated UE context. In some embodiments the resuming eNB can deduce from the Resume ID which eNB is the suspending eNB, but in other embodiments the resuming eNB can identify the suspending eNB or suspending cell from an identifier for the suspending eNB or suspending cell the UE 42 included in the RRC connection resume request.

The suspending eNB 40 receives request 611, retrieves the UE context associated with the Resume ID and sends the UE context to the resuming eNB in response message 613. The response message 613 also includes $K_{eNB}*$, the security algorithm configuration, and the authorization token for the UE 42.

In the event that no UE context is found by the suspending eNB, the suspending eNB responds to the resuming eNB with an error message 613 indicating that no UE is associated with the Resume ID.

Assuming that the response message 613 contains the UE context, the resuming eNB verifies the authorization token contained in resume request 609 by matching it to the authorization token received from the suspending eNB (step 615). In some embodiments the matching operation may be a simple comparison, but in other embodiments the matching operation is not a simple comparison. The suspending eNB may, for instance, provide a first value to the resuming eNB, which then computes a function of that value to produce a second value that is compared to the authorization token.

Assuming the authorization token (and thus the UE 42) is verified, the resuming eNB 40 ensures that the security algorithm configuration is supported and, if so, establishes AS security using $K_{eNB}*$ (step 617).

Provided that the previous steps 615 and 617 were successful, the resuming eNB can then derive the encryption key from the AS base key and decrypt the uplink data received in the resume request message 609, and forward the UL data to the core network (step 619).

The resuming eNB then sends a completion message 621 (labelled 'RRC Connection Resume Complete' in FIG. 6) to the UE to indicate that the connection has been resumed.

The UE 42 is now in the RRC Connected state or mode, and can send data 623 to the resuming eNB 40 in the UL and receive data 625 from the resuming eNB 40 in the DL.

However, if the resuming eNB was unable to obtain the UE context or step 615 failed, the connection resumption is aborted and an error message is returned to the UE instead of the completion message 621. If step 617 failed (i.e. due to an invalid security algorithm configuration) the RRC connection may still be resumed but the response message 621 will indicate that UL data has not been forwarded. In this case the response 621 may also contain one or more of the supported security algorithm configurations to enable the UE to determine the correct $K_{eNB}*$. Only one configuration per security algorithm type (integrity/encryption) is indicated.

As an alternative to including the security algorithm configuration in the RRC Connection Suspend message 601, the security algorithm configuration can be assumed to remain the same when the RRC Connection is resumed as it was before it was suspended. The suspending eNB therefore provides the security algorithm configuration to the resuming eNB, for example in or alongside the UE context response message 613. If the security algorithm configuration is supported by the resuming eNB then the RRC Connection can be resumed as shown in FIG. 6. Otherwise if the security algorithm configuration is not supported by the resuming eNB, an alternative security configuration can be provided in the response message 621 from the resuming eNB to the UE. The resuming eNB may also simply reject the RRC Connection Resume Request 609 or release the RRC Connection. If the RRC Connection Resume Request

609 is rejected the UE may, e.g., attempt RRC Connection reestablishment. If the RRC Connection is released the UE may, e.g. attempt new RRC Connection establishment from idle.

In some embodiments, instead of (or in addition to) including an authorization token in the RRC Connection Resume Request 609, the UE can integrity protect the whole RRC Connection Resume Request 609 using an integrity protection key derived from the new AS base key $K_{eNB}*$ and the integrity algorithm in the security algorithm configuration. In step 615 or 617 the resuming eNB would then verify the UE identity by verifying the integrity protection of message 609. It will be appreciated that this approach requires the resuming eNB to support the security algorithm configuration, and if that is not the case, the resume request 609 will be have to be rejected since it cannot be verified.

In the description above it is assumed that the suspending eNB is different to the resuming eNB (i.e. it is an inter-eNB RRC resume). In the scenario where the suspending and resuming eNB are the same (i.e. it is an intra-eNB RRC resume) the procedure is the same as shown in FIG. 6 except that signals 611 and 613 occur internally in the eNB (i.e. the eNB searches a memory or database using the Resume ID and retrieves the required UE context).

In addition, if a connection is resumed in the same cell (as identified by its PCI and EARFCN-DL), the UE and eNB can either derive a new AS-base key, or continue using the existing one. In the latter case it is important that a Packet Data Convergence Protocol (PDCP) COUNT is not reset to prevent the same key stream being used twice. One option here is for the suspending eNB to indicate its preference for deriving a new AS-base key or continue using the existing one when the RRC connection is suspended.

Figure 7:
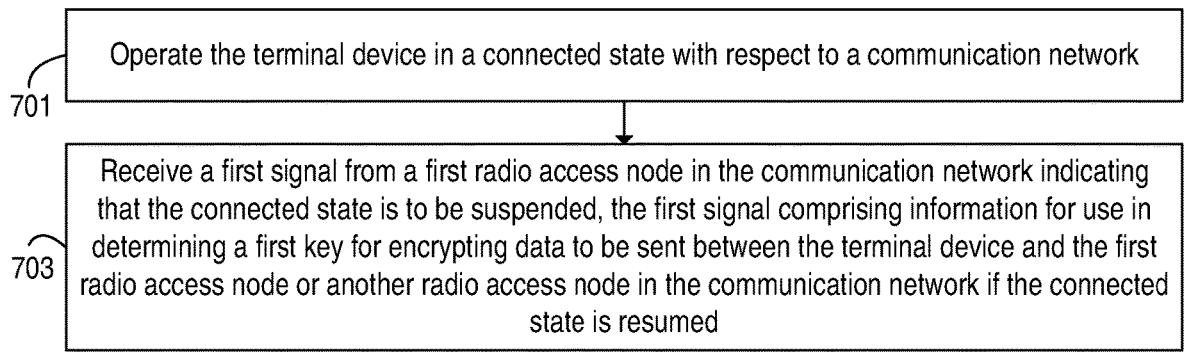
FIG. 7 is a flow chart illustrating a method of operating a terminal device according to a general embodiment.
Figure 8:
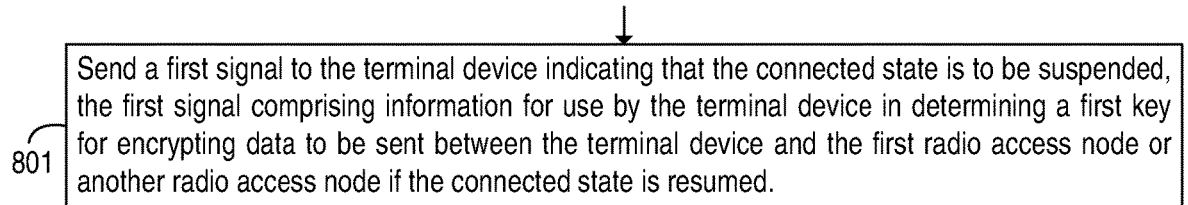
FIG. 8 is a flow chart illustrating a method of operating a first radio access node according to another general embodiment.
Figure 9:
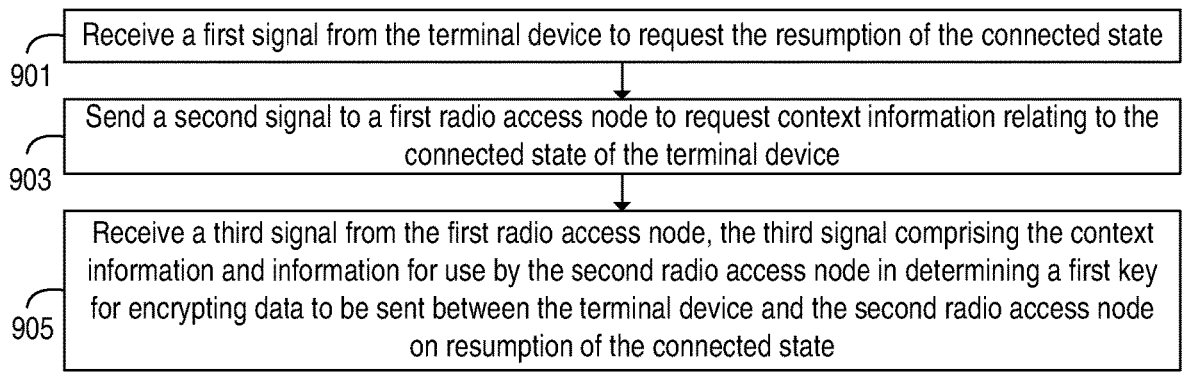
FIG. 9 is a flow chart illustrating a method of operating a second radio access node according to another general embodiment.

The flow charts in FIGS. 7, 8 and 9, illustrate general methods of operating a terminal device 42, a first radio access node 40 and a second radio access node 40 according to the exemplary techniques described herein. The first radio access node 40 corresponds to the suspending eNB 40 in FIG. 6 and the second radio access node 40 corresponds to the resuming eNB in FIG. 6.

FIG. 7 illustrates the operation of a terminal device according to a general embodiment. In step 701, the terminal device 42 is operating in a connected state with respect to a communication network 32. The connected state can be a RRC Connected state.

The terminal device 42 then receives a first signal from a first radio access node 40 in the communication network (step 703). The first signal indicates that the connected state is to be suspended, and comprises information for use in determining a first key for encrypting data to be sent between the terminal device 42 and the first radio access node 40 or another radio access node 40 in the communication network 32 if the connected state is resumed.

In the specific embodiment of FIG. 6, the first signal corresponds to RRC Connection Suspend 601.

In some embodiments, on receipt of the first signal, the terminal device stores context information relating to the connected state with the communication network and stores the received information for use in determining a first key for encrypting data. The context information and/or received information for use in determining the first key can be stored in memory unit 56. The terminal device then switches into an idle (e.g. RRC Idle) or suspended state with respect to the communication network.

In some embodiments the first signal can also comprise an identifier for the terminal device to be used by the terminal device when requesting the resumption of the connected state. This identifier is the Resume ID in the embodiment of FIG. 6. In some embodiments the first signal can also comprise an authorization token for the terminal device, and/or information identifying a security algorithm configuration to be used for encrypting data. The identifier for the terminal device, the authorization token and/or information identifying a security algorithm configuration to be used for encrypting data can also be stored by the terminal device.

In some embodiments, for example where the communication network is operating according to the LTE specifications, the information for use in determining a first key for encrypting data can comprise a Next Hop Chaining Counter, NCC, value.

If the connected state is to be resumed, the terminal device 42 determines a first key for encrypting data that is to be sent on resumption of the connected state. The first key is determined using the information received in the first signal.

In some embodiments, the information in the first signal can be used to determine whether the first key is to be determined from a second key that was previously used by the terminal device in encrypting data sent between the terminal device and the first radio access node.

In some embodiments, the information in the first signal comprises a counter value (for example a NCC value), and if the counter value matches a counter value associated with the second key, the first key is determined from the second key and information relating to the radio access node with which the connected state is to be resumed; and otherwise (i.e. if the counter value does not match a counter value associated with the second key) an intermediate key value (for example a NH value) is computed from the counter value received in the first signal and the first key is determined from the intermediate key value and information relating to the radio access node with which the connected state is to be resumed.

In some embodiments, if the connected state is to be resumed with the first radio access node, the terminal device can use a key that was previously used by the terminal device in encrypting data sent between the terminal device and the first radio access node as the first key.

In some embodiments, the terminal device 42 sends a second signal to the first radio access node or another radio access node in the communication network to request the resumption of the connected state. The second signal corresponds to the RRC Connection Resume Request 609 in the specific embodiment of FIG. 6. The second signal can be sent, for example, when new data arrives in the UL buffer of the terminal device 42.

In some embodiments, the second signal can also comprise an identifier for the terminal device provided by the first radio access node and/or an identifier for the first radio access node. The identifier for the terminal device can be the Resume ID that was sent to the terminal device in the first signal. The second signal can also or alternatively comprise an authorization token for the terminal device (for example that was received by the terminal device in the first signal).

In some embodiments, the second signal further comprises data to be sent from the terminal device to the communication network 32. The data will have been encrypted by the terminal device 42 using the first key. In some embodiments, the terminal device will have encrypted the data using the first key according to a security algorithm configuration indicated in the first signal. In alternative embodiments, the terminal device will have encrypted the data using the first key according to a security algorithm configuration previously used with the first radio access node (regardless of whether the terminal device is trying to resume the connected state with the first radio access node 40 or another radio access node 40).

In some embodiments, after sending the second signal to a radio access node, the terminal device can receive a third signal from that radio access node indicating that the connected state has been resumed or that an error occurred in resuming the connected state. The third signal corresponds to the RRC Connection Resume Complete 621 (or the equivalent error signal 621) in the embodiment of FIG. 6.

In some cases, for example if the radio access node is unable to decrypt the encrypted data, the third signal can indicate that an error occurred in resuming the connected state and further indicate a security algorithm configuration to be used by the terminal device to encrypt data.

FIG. 8 illustrates the operation of a first radio access node 40 according to a general embodiment. The radio access node 40 is operating in a communication network 32 and there is a terminal device 42 that is in a connected state with respect to the communication network 32. The first radio access node 40 corresponds to the first radio access node 40 described above with respect to the method in FIG. 7. In a first step, the first radio access node 40 sends a first signal to the terminal device (step 801). The first signal (which in the specific embodiment of FIG. 6 corresponds to the RRC Connection Suspend message 601) indicates that the connected state is to be suspended, and comprises information for use by the terminal device in determining a first key for encrypting data to be sent between the terminal device and the first radio access node or another radio access node in the communication network if the connected state is resumed.

In some embodiments the first signal further comprises an identifier for the terminal device to be used by the terminal device when requesting the resumption of the connected state. This identifier corresponds to the Resume ID in the specific embodiment of FIG. 6.

In some embodiments, the first signal further comprises an authorization token for the terminal device, and/or information identifying a security algorithm configuration to be used for encrypting data.

In some embodiments, the information for use in determining the first key for encrypting data comprises a NCC value.

In some embodiments, after sending the first signal in step 801, the first radio access node stores context information relating to the connected state of the terminal device, for example in memory unit 66.

In some embodiments, the first radio access node 40 receives a second signal from the terminal device to request the resumption of the connected state. The second signal corresponds to the RRC Connection Resume Request 609 in the specific embodiment of FIG. 6.

In some embodiments, the second signal further comprises encrypted data, and thus, in some embodiments, the first radio access node attempts to decrypt the encrypted data using the first key.

In some embodiments, the second signal comprises an identifier for the terminal device that was sent to the terminal device in the first signal (e.g. the Resume ID), and the first radio access node uses the received identifier to retrieve context information relating to the connected state of the terminal device (e.g. from memory unit 66).

In some embodiments, the first radio access node sends a third signal to the terminal device indicating that the connected state has been resumed or that an error occurred in resuming the connected state. The third signal corresponds to the RRC Connection Resume Complete message 621 in the specific embodiment of FIG. 6.

In some embodiments, if an error occurred in resuming the connected state, the third signal can indicate that an error occurred and indicate a security algorithm configuration to be used by the terminal device to encrypt data.

In some embodiments, the first radio access node can determine a first key for encrypting data on resumption of the connected state with the terminal device.

In some embodiments, the first radio access node can determine whether the first key is to be determined from a second key that was previously used in encrypting data sent between the first radio access node and the terminal device. In some embodiments, the first radio access node maintains a counter value (e.g. a NCC value), and the first radio access node can determine whether the first key is to be determined from the second key based on the counter value. In particular, if the counter value matches a counter value associated with the second key, the first radio access node determines the first key from the second key and information relating to the first radio access node, and if the counter value does not match a counter value associated with the second key, the first key is determined from an intermediate key value (e.g. a NH value) and information relating to the first radio access node.

In some embodiments, the first key is a key that was previously used for encrypting data sent between the terminal device and the first radio access node.

In embodiments where the terminal device 42 attempts to resume the connected state with another radio access node (e.g. a second radio access node 40), the first radio access node 40 may receive a request from the second radio access node for context information relating to the connected state of the terminal device with the communication network. This request corresponds to UE Context Request message 611 in the embodiment of FIG. 6. In response to receiving the request, the first radio access node retrieves context information relating to the connected state of the terminal device from a memory, and sends the retrieved context information to the second radio access node. The first radio access node can also send the first key, an authorization token for the terminal device, a security algorithm configuration to be used by the terminal device to encrypt data, and/or the information for use by the terminal device in determining the first key to the second radio access node 40.

FIG. 9 illustrates the operation of a second radio access node 40 according to a general embodiment. The radio access node 40 is operating in a communication network 32 and there is a terminal device 42 that had a connected state with respect to the communication network 32 suspended. The second radio access node 40 corresponds to the second radio access node 40 described above with respect to the method in FIG. 7.

In a first step, step 901, the second radio access node 40 receives a first signal from the terminal device to request the resumption of the connected state. This first signal corresponds to RRC Connection Resume Request 609 in the specific embodiment of FIG. 6.

The second radio access node then sends a second signal to a first radio access node to request context information relating to the connected state of the terminal device with the communication network (step 903). The second signal corresponds to UE Context Request message 611 in the specific embodiment of FIG. 6.

After sending the second signal, the second radio access node receives a third signal from the first radio access node, with the third signal comprising the context information and a first key for encrypting data to be sent between the terminal device and the second radio access node on resumption of the connected state (step 905). The third signal corresponds to UE Context Response message 613 in the specific embodiment of FIG. 6.

In some embodiments, the first signal further comprises an identifier for the terminal device (e.g. Resume ID) and/or an identifier for the first radio access node. In embodiments where only the identifier for the terminal device is included in the first signal, the second radio access node 40 can use the identifier for the terminal device to identify the radio access node that the request for context information is to be sent.

In some embodiments, the first signal further comprises an authorization token for the terminal device. In further or alternative embodiments, the first signal also comprises a security algorithm configuration to be used by the terminal device to encrypt data.

In some embodiments, the first signal further comprises encrypted data from the terminal device. In some embodiments, the second radio access node can attempt to decrypt the encrypted data using the first key. In some embodiments, if the encrypted data can be decrypted, the second radio access node sends a fourth signal to the terminal device indicating that the connected state has been resumed. The fourth signal corresponds to the RRC Connection Resume Complete message 621 in the specific embodiment of FIG. 6. Alternatively, if the encrypted data cannot be decrypted, the second radio access node can send a fourth signal to the terminal device indicating that an error occurred in resuming the connected state. In some embodiments, where the fourth signal indicates that an error occurred, the fourth signal can further comprise an indication of a security algorithm configuration to be used by the terminal device to encrypt data.

In some embodiments, after receiving the third signal, the second radio access node can verify the identity of the terminal device. In some embodiments, verifying the identity of the terminal device can comprise verifying an authorization token for the terminal device and/or verifying an integrity protection of the first signal. In some embodiments, a fourth signal indicating that an error occurred in resuming the connected state can be sent to the terminal device if the identity of the terminal device cannot be verified. In some embodiments, a fourth signal can be sent to the terminal device indicating that an error occurred in resuming the connected state if the third signal from the first radio access node is not received or if the received third signal does not comprise context information and/or a first key.

Thus, according to the exemplary techniques described herein, a UE is allowed to quickly transmit user plane data when resuming an RRC connection. This is useful, e.g., in use cases where millions of sensors send small amounts of data relatively infrequently, but also in regular smart phones.

It is noted that 3GPP is studying UE management for cellular IoT (Internet of Things), that makes use of a state that is similar to RRC suspended state, i.e. a state where AS information is cached in the UE and in the network for a smooth subsequent transition to a state where data can be exchanged between the UE and the network, and this state will also benefit from this new functionality in the context of the security aspects. Similar UE management is also considered as a viable option for the next evolution of the 3GPP standard, which is sometimes referred to as 5G.

Figure 10:
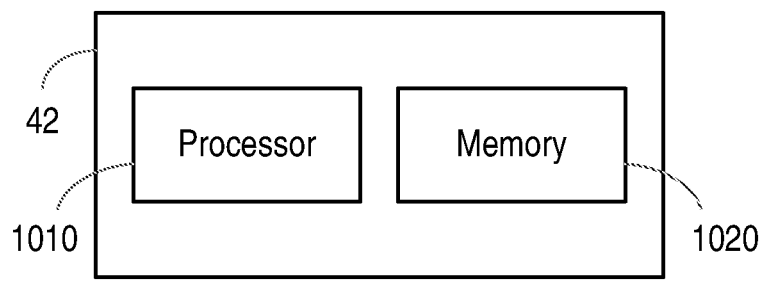
FIG. 10 is a block diagram of a terminal device according to another embodiment.

FIG. 10 is a block diagram of a terminal device 42 according to another embodiment. The terminal device 42 comprises a processor 1010 and a memory 1020. The memory 1020 contains instructions executable by the processor 1010 whereby the terminal device 42 is operative to operate in a connected state with respect to the communication network 32, and receive a first signal from a first radio access node 40 in the communication network 32 indicating that the connected state is to be suspended. The first signal comprises information for use in determining a first key for encrypting data to be sent between the terminal device 42 and the first radio access node 40 or another radio access node 40 in the communication network 32 if the connected state is resumed.

Figure 11:
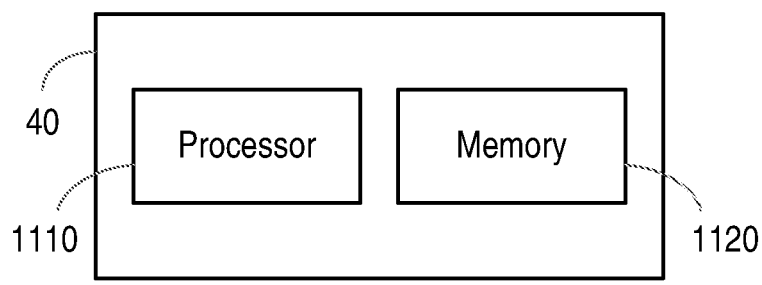
FIG. 11 is a block diagram of a first radio access node according to another embodiment.

FIG. 11 is a block diagram of a first radio access node 40 according to another embodiment. The first radio access node 40 is for use in a communication network 32, and the first radio access node comprises a processor 1110 and a memory 1120, and the memory 1120 contains instructions executable by the processor 1110 whereby the first radio access node 40 is operative to send a first signal to a terminal device 42 that is in a connected state with respect to the communication network 32. The first signal indicates that the connected state is to be suspended, and the first signal comprises information for use by the terminal device 42 in determining a first key for encrypting data to be sent between the terminal device 32 and the first radio access node 40 or another radio access node 40 in the communication network 32 if the connected state is resumed.

Figure 12:
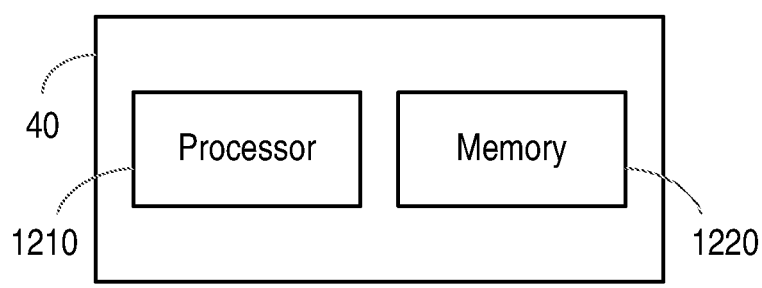
FIG. 12 is a block diagram of a second radio access node according to another embodiment.

FIG. 12 is a block diagram of a second radio access node 40 according to another embodiment. The second radio access node 40 is for use in a communication network 32, and the second radio access node 40 comprises a processor 1210 and a memory 1220. The memory 1220 contains instructions executable by the processor 1210 whereby the second radio access node 40 is operative to receive a first signal from a terminal device 42 that has had a connected state with respect to the communication network 32 suspended, the first signal requesting the resumption of the connected state; send a second signal to a first radio access node 40 to request context information relating to the connected state of the terminal device 42 with the communication network 32; and receive a third signal from the first radio access node 40, the third signal comprising the context information and a first key for encrypting data to be sent between the terminal device 42 and the second radio access node 40 on resumption of the connected state.

Figure 13:
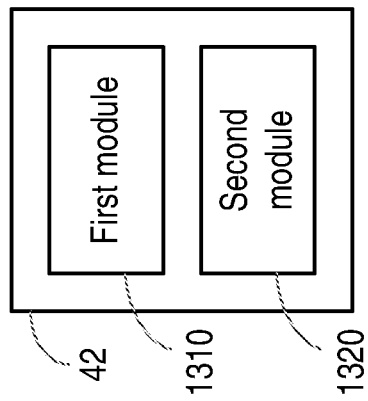
FIG. 13 is a block diagram of a terminal device according to yet another embodiment.

FIG. 13 is a block diagram of a terminal device 42 according to yet another embodiment. The terminal device 42 comprises a first module 1310 configured to operate the terminal device 42 in a connected state with respect to the communication network; and a second module 1320 configured to receive a first signal from a first radio access node 40 in the communication network 32 indicating that the connected state is to be suspended. The first signal comprises information for use in determining a first key for encrypting data to be sent between the terminal device 42 and the first radio access node 40 or another radio access node 40 in the communication network 32 if the connected state is resumed.

Figure 14:
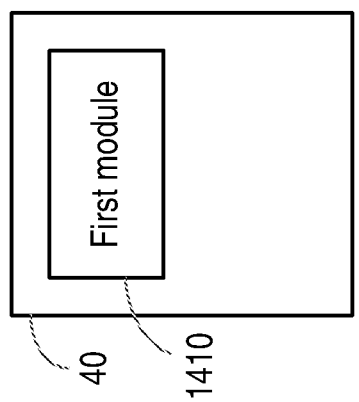
FIG. 14 is a block diagram of a first radio access node according to yet another embodiment.

FIG. 14 is a block diagram of a first radio access node 40 according to yet another embodiment. The first radio access node 40 is for use in a communication network 32, and comprises a first module 1410 configured to send a first signal to a terminal device 42 that is in a connected state with respect to the communication network 32. The first signal indicates that the connected state is to be suspended, and the first signal comprises information for use by the terminal device 42 in determining a first key for encrypting data to be sent between the terminal device 42 and the first radio access node 40 or another radio access node 40 in the communication network 32 if the connected state is resumed.

Figure 15:
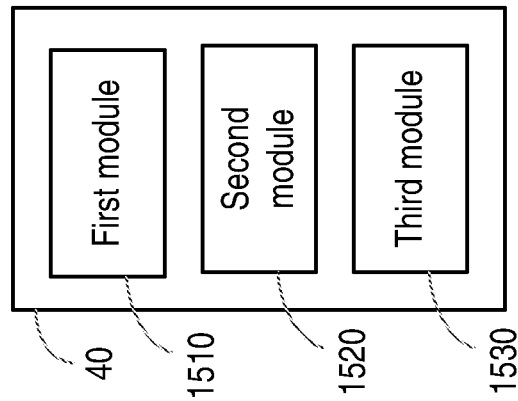
FIG. 15 is a block diagram of a second radio access node according to yet another embodiment.

FIG. 15 is a block diagram of a second radio access node 40 according to yet another embodiment. The second radio access node 40 is for use in a communication network 32, and comprises a first module 1510 for receiving a first signal from a terminal device 42 that has had a connected state with respect to the communication network 32 suspended, the first signal requesting the resumption of the connected state; a second module 1520 for sending a second signal to a first radio access node 40 to request context information relating to the connected state of the terminal device 42 with the communication network 32; and a third module 1530 for receiving a third signal from the first radio access node 40, the third signal comprising the context information and a first key for encrypting data to be sent between the terminal device 42 and the second radio access node 40 on resumption of the connected state.

The modules illustrated in FIGS. 13-15 and discussed above may in some embodiments be implemented as computer programs/instructions for execution by one or more processor (e.g. processor 1010 in a terminal device, processor 1110 in a first radio access node or processor 1210 in a second radio access node as illustrated in FIGS. 10-12).

Modifications and other variants of the described embodiment(s) will come to mind to one skilled in the art having the benefit of the teachings presented in the foregoing descriptions and the associated drawings. Therefore, it is to be understood that the embodiment(s) is/are not to be limited to the specific examples disclosed and that modifications and other variants are intended to be included within the scope of this disclosure. Although specific terms may be employed herein, they are used in a generic and descriptive sense only and not for purposes of limitation.

Various exemplary aspects and embodiments of the techniques presented herein are set out in the numbered statements below:

1. A method of operating a terminal device, the method comprising:
   operating the terminal device in a connected state with respect to the communication network; and
   receiving a first signal from a first radio access node in the communication network indicating that the connected state is to be suspended, the first signal comprising information for use in determining a first key for encrypting data to be sent between the terminal device and the first radio access node or another radio access node in the communication network if the connected state is resumed.

2. A method as defined in statement 1, wherein, on receipt of the first signal, the method further comprises the steps of:
   storing context information relating to the connected state with the communication network;
   storing the received information for use in determining a first key for encrypting data; and
   switching the terminal device into an idle or suspended state with respect to the communication network.

3. A method as defined in statement 1 or 2, wherein the first signal further comprises an identifier for the terminal device to be used by the terminal device when requesting the resumption of the connected state.

4. A method as defined in statement 1, 2 or 3, wherein the first signal further comprises an authorization token for the terminal device.

5. A method as defined in any of statements 1-4, wherein the first signal further comprises information identifying a security algorithm configuration to be used for encrypting data.

6. A method as defined in any of statements 1-5, wherein the information for use in determining a first key for encrypting data comprises a Next Hop Chaining Counter, NCC, value.

7. A method as defined in any of statements 1-6, wherein the method further comprises the step of:
   determining a first key for encrypting data to be sent on resumption of the connected state using the information in the first signal.

8. A method as defined in statement 7, wherein the step of determining a first key for encrypting data comprises:
   using the information in the first signal to determine whether the first key is to be determined from a second key that was previously used by the terminal device in encrypting data sent between the terminal device and the first radio access node.

9. A method as defined in statement 8, wherein the information in the first signal comprises a counter value, and wherein the step of using the information in the first signal to determine whether the first key is to be determined from a second key that was previously used by the terminal device comprises:
   determining the first key from the second key and information relating to the radio access node with which the connected state is to be resumed in the event that the counter value matches a counter value associated with the second key; and
   in the event that the counter value does not match a counter value associated with the second key, computing an intermediate key value from the counter value received in the first signal, and determining the first key from the intermediate key value and information relating to the radio access node with which the connected state is to be resumed.

10. A method as defined in statement 9, wherein the counter value is a Next Hop Chaining Counter, NCC, value, and/or the intermediate key value is a Next Hop, NH, value.

11. A method as defined in any of statements 1-6, wherein in the event that the connected state is to be resumed with the first radio access node, the first key comprises a key that was previously used by the terminal device in encrypting data sent between the terminal device and the first radio access node.

12. A method as defined in any of statements 1-11, wherein the method further comprises the step of:
   sending a second signal to the first radio access node or another radio access node in the communication network to request the resumption of the connected state.

13. A method as defined in statement 12, wherein the second signal further comprises an identifier for the terminal device provided by the first radio access node and/or an identifier for the first radio access node.

14. A method as defined in statement 12 or 13, wherein the second signal further comprises data to be sent from the terminal device to the communication network, wherein the data is encrypted using the first key.

15. A method as defined in statement 14, wherein the terminal device encrypts the data using the first key according to a security algorithm configuration indicated in the first signal.

16. A method as defined in statement 14, wherein the terminal device encrypts the data using the first key according to a security algorithm configuration previously used with the first radio access node.

17. A method as defined in any of statements 12-16, wherein the method further comprises the step of:

receiving a third signal from the first radio access node or said another radio access node indicating that the connected state has been resumed or that an error occurred in resuming the connected state.

18. A method as defined in statement 17, wherein the third signal indicates that an error occurred in resuming the connected state and further indicates a security algorithm configuration to be used by the terminal device to encrypt data.

19. A method as defined in any of statements 1-18, wherein the connected state is a radio resource control, RRC, connected state.

20. A computer program product comprising a computer readable medium having computer readable code embodied therein, the computer readable code being configured such that, on execution by a suitable computer or processor, the computer or processor is caused to perform the method of any of statements 1-19.

21. A terminal device, the terminal device being adapted to:
operate in a connected state with respect to the communication network; and
receive a first signal from a first radio access node in the communication network indicating that the connected state is to be suspended, the first signal comprising information for use in determining a first key for encrypting data to be sent between the terminal device and the first radio access node or another radio access node in the communication network if the connected state is resumed.

22. A terminal device, the terminal device comprising a processor and a memory, said memory containing instructions executable by said processor whereby said terminal device is operative to:
operate in a connected state with respect to the communication network; and
receive a first signal from a first radio access node in the communication network indicating that the connected state is to be suspended, the first signal comprising information for use in determining a first key for encrypting data to be sent between the terminal device and the first radio access node or another radio access node in the communication network if the connected state is resumed.

23. A terminal device, the terminal device comprising:
a first module configured to operate the terminal device in a connected state with respect to the communication network; and
a second module configured to receive a first signal from a first radio access node in the communication network indicating that the connected state is to be suspended, the first signal comprising information for use in determining a first key for encrypting data to be sent between the terminal device and the first radio access node or another radio access node in the communication network if the connected state is resumed.

24. A method of operating a first radio access node in a communication network, the method comprising:
sending a first signal to a terminal device that is in a connected state with respect to the communication network, the first signal indicating that the connected state is to be suspended, the first signal comprising information for use by the terminal device in determining a first key for encrypting data to be sent between the terminal device and the first radio access node or another radio access node in the communication network if the connected state is resumed.

25. A method as defined in statement 24, wherein the first signal further comprises an identifier for the terminal device to be used by the terminal device when requesting the resumption of the connected state.

26. A method as defined in statement 24 or 25, wherein the first signal further comprises an authorization token for the terminal device.

27. A method as defined in any of statements 24-26, wherein the first signal further comprises information identifying a security algorithm configuration to be used for encrypting data.

28. A method as defined in any of statements 24-27, wherein the information for use in determining the first key for encrypting data comprises a Next Hop Chaining Counter, NCC, value.

29. A method as defined in any of statements 24-28, wherein, after sending the first signal, the method further comprises the step of:
storing context information relating to the connected state of the terminal device.

30. A method as defined in any of statements 24-29, wherein the method further comprises the step of:
receiving a second signal from the terminal device to request the resumption of the connected state.

31. A method as defined in statement 30, wherein the second signal further comprises encrypted data.

32. A method as defined in statement 31, wherein the method further comprises the step of:
attempting to decrypt the encrypted data using the first key.

33. A method as defined in statement 30, 31 or 32, wherein the second signal comprises an identifier for the terminal device that was sent to the terminal device in the first signal, and wherein the method further comprises the step of:
using the received identifier to retrieve context information relating to the connected state of the terminal device.

34. A method as defined in any of statements 30-33, wherein the method further comprises the step of:
sending a third signal to the terminal device indicating that the connected state has been resumed or that an error occurred in resuming the connected state.

35. A method as defined in statement 34, wherein the third signal indicates that an error occurred in resuming the connected state and further indicates a security algorithm configuration to be used by the terminal device to encrypt data.

36. A method as defined in any of statements 30-35, wherein the method further comprises the step of:
determining a first key for encrypting data on resumption of the connected state with the terminal device.

37. A method as defined in statement 36, wherein the step of determining a first key for encrypting data comprises:
determining whether the first key is to be determined from a second key that was previously used in encrypting data sent between the first radio access node and the terminal device.

38. A method as defined in statement 37, wherein the first radio access node maintains a counter value, and wherein the step of determining whether the first key is to be determined from a second key comprises:
determining the first key from the second key and information relating to the first radio access node in the event that the counter value matches a counter value associated with the second key; and
in the event that the counter value does not match a counter value associated with the second key, determining the first key from an intermediate key value and information relating to the first radio access node.

39. A method as defined in statement 38, wherein the counter value is a Next Hop Chaining Counter, NCC, value, and/or the intermediate key value is a Next Hop, NH, value.

40. A method as defined in statement 36, wherein the first key comprises a key that was previously used for encrypting data sent between the terminal device and the first radio access node.

41. A method as defined in any of statements 24-29, wherein the method further comprises the steps of:
receiving a request from a second radio access node in the communication network, the request comprising a request for context information relating to the connected state of the terminal device with the communication network;
retrieving context information relating to the connected state of the terminal device from a memory; and
sending the retrieved context information to the second radio access node.

42. A method as defined in statement 41, wherein the method further comprises the step of:
sending the first key and/or the information for use by the terminal device in determining the first key to the second radio access node.

43. A method as defined in any of statements 24-42, wherein the connected state is a radio resource control, RRC, connected state.

44. A computer program product comprising a computer readable medium having computer readable code embodied therein, the computer readable code being configured such that, on execution by a suitable computer or processor, the computer or processor is caused to perform the method of any of statements 24-43.

45. A first radio access node for use in a communication network, wherein the first radio access node is adapted to:
send a first signal to a terminal device that is in a connected state with respect to the communication network, the first signal indicating that the connected state is to be suspended, the first signal comprising information for use by the terminal device in determining a first key for encrypting data to be sent between the terminal device and the first radio access node or another radio access node in the communication network if the connected state is resumed.

46. A first radio access node for use in a communication network, the first radio access node comprising a processor and a memory, said memory containing instructions executable by said processor whereby said first radio access node is operative to:
send a first signal to a terminal device that is in a connected state with respect to the communication network, the first signal indicating that the connected state is to be suspended, the first signal comprising information for use by the terminal device in determining a first key for encrypting data to be sent between the terminal device and the first radio access node or another radio access node in the communication network if the connected state is resumed.

47. A first radio access node for use in a communication network, the first radio access node comprising:
a first module configured to send a first signal to a terminal device that is in a connected state with respect to the communication network, the first signal indicating that the connected state is to be suspended, the first signal comprising information for use by the terminal device in determining a first key for encrypting data to be sent between the terminal device and the first radio access node or another radio access node in the communication network if the connected state is resumed.

48. A method of operating a second radio access node in a communication network, the method comprising:
receiving a first signal from a terminal device that has had a connected state with respect to the communication network suspended, the first signal requesting the resumption of the connected state;
sending a second signal to a first radio access node to request context information relating to the connected state of the terminal device with the communication network; and
receiving a third signal from the first radio access node, the third signal comprising the context information and a first key for encrypting data to be sent between the terminal device and the second radio access node on resumption of the connected state.

49. A method as defined in statement 48, wherein the first signal further comprises an identifier for the terminal device and/or an identifier for the first radio access node.

50. A method as defined in statement 48 or 49, wherein the first signal further comprises an authorization token for the terminal device.

51. A method as defined in statement 50, wherein the first signal further comprises encrypted data.

52. A method as defined in statement 51, wherein the method further comprises the step of:
attempting to decrypt the encrypted data using the first key.

53. A method as defined in statement 52, wherein the method further comprises the step of:
sending a fourth signal to the terminal device indicating that the connected state has been resumed if the encrypted data can be decrypted.

54. A method as defined in statement 52 or 53, wherein the method further comprises the step of:
sending a fourth signal to the terminal device indicating that an error occurred in resuming the connected state if the encrypted data cannot be decrypted.

55. A method as defined in statement 54, wherein the fourth signal further comprises an indication of a security algorithm configuration to be used by the terminal device to encrypt data.

56. A method as defined in any of statements 48-55, wherein the method further comprises the step of:
verifying the identity of the terminal device.

57. A method as defined in statement 56, wherein the step of verifying the identity of the terminal device comprises verifying an authorization token for the terminal device and/or verifying an integrity protection of the first signal.

58. A method as defined in statement 56 or 57, wherein the method further comprises the step of:
sending a fourth signal to the terminal device indicating that an error occurred in resuming the connected state if the identity of the terminal device cannot be verified.

59. A method as defined in any of statements 48-58, wherein the method further comprises the step of:
sending a fourth signal to the terminal device indicating that an error occurred in resuming the connected state if the third signal from the first radio access node is not received or if the received third signal does not comprise context information and/or a first key.

60. A method as defined in any of statements 48-59, wherein the connected state is a radio resource control, RRC, connected state.

61. A computer program product comprising a computer readable medium having computer readable code embodied therein, the computer readable code being configured such that, on execution by a suitable computer or processor, the computer or processor is caused to perform the method of any of statements 48-60.

62. A second radio access node for use in a communication network, the second radio access node being adapted to:
    receive a first signal from a terminal device that has had a connected state with respect to the communication network suspended, the first signal requesting the resumption of the connected state;
    send a second signal to a first radio access node to request context information relating to the connected state of the terminal device with the communication network; and
    receive a third signal from the first radio access node, the third signal comprising the context information and a first key for encrypting data to be sent between the terminal device and the second radio access node on resumption of the connected state.

63. A second radio access node for use in a communication network, the second radio access node comprising a processor and a memory, said memory containing instructions executable by said processor whereby said second radio access node is operative to:
    receive a first signal from a terminal device that has had a connected state with respect to the communication network suspended, the first signal requesting the resumption of the connected state;
    send a second signal to a first radio access node to request context information relating to the connected state of the terminal device with the communication network; and
    receive a third signal from the first radio access node, the third signal comprising the context information and a first key for encrypting data to be sent between the terminal device and the second radio access node on resumption of the connected state.

64. A second radio access node for use in a communication network, the second radio access node comprising:
    a first module for receiving a first signal from a terminal device that has had a connected state with respect to the communication network suspended, the first signal requesting the resumption of the connected state;
    a second module for sending a second signal to a first radio access node to request context information relating to the connected state of the terminal device with the communication network; and
    a third module for receiving a third signal from the first radio access node, the third signal comprising the context information and a first key for encrypting data to be sent between the terminal device and the second radio access node on resumption of the connected state.

65. A terminal device adapted to perform operations according to any one of statements 1-19.

66. A first radio access node for use in a communication network and adapted to perform operations according to any one of statements 24-43.

67. A second radio access node for use in a communication network and adapted to perform operations according to any one of statements 48-60.

68. A terminal device, the terminal device comprising a processor and a memory, said memory containing instructions executable by said processor whereby said terminal device is operative to perform operations according to any one of statements 1-19.

69. A first radio access node for use in a communication network, the first radio access node comprising a processor and a memory, said memory containing instructions executable by said processor whereby said first radio access node is operative to perform operations according to any one of statements 24-43.

70. A second radio access node for use in a communication network, the second radio access node comprising a processor and a memory, said memory containing instructions executable by said processor whereby said second radio access node is operative to perform operations according to any one of statements 48-60.

The invention claimed is:

1. A method of operating a terminal device, the method comprising:
    operating the terminal device in a connected state with respect to the communication network; and
    receiving a first signal from a first radio access node in the communication network indicating that the connected state is to be suspended, the first signal comprising information for use in determining a first key for encrypting data to be sent between the terminal device and one of the first radio access node and another radio access node in the communication network if the connected state is resumed, the information for use in determining the first key for encrypting data comprising a Next Hop Chaining Counter (NCC) value and the first signal further comprising an identifier for the terminal device to be used by the terminal device when requesting the resumption of the connected state.

2. The method as defined in claim 1, further comprising, on receipt of the first signal:
    storing context information relating to the connected state with the communication network;
    storing the received information for use in determining the first key for encrypting data; and
    switch the terminal device into one of an idle and suspended state with respect to the communication network.

3. The method as defined in claim 1, further comprising:
    determining the first key for encrypting data to be sent on resumption of the connected state using the information in the first signal.

4. The method as defined in claim 1, further comprising:
    sending a second signal to one of the first radio access node and another radio access node in the communication network to request the resumption of the connected state.

5. The method as defined in claim 4, wherein the second signal further comprises data to be sent from the terminal device to the communication network, wherein the data is encrypted using the first key.

6. The method as defined in claim 5, further comprising:
    encrypting the data using the first key according to a security algorithm configuration previously used with the first radio access node.

7. A method of operating a first radio access node in a communication network, the method comprising:
    sending a first signal to a terminal device that is in a connected state with respect to the communication network, the first signal indicating that the connected state is to be suspended, the first signal comprising information for use by the terminal device in determining a first key for encrypting data to be sent between the terminal device and one of the first radio access node and another radio access node in the communication network if the connected state is resumed, the information for use in determining the first key for encrypting data comprising a Next Hop Chaining Counter (NCC) value and the first signal further comprising an identifier for the terminal device to be used by the terminal device when requesting the resumption of the connected state.

8. The method as defined in claim 7, further comprising: receiving a second signal from the terminal device to request the resumption of the connected state.

9. The method as defined in claim 8, wherein the second signal further comprises encrypted data.

10. The method as defined in claim 9, further comprising: attempting to decrypt the encrypted data using the first key.

11. A computer readable non-transitory medium having computer readable code embodied therein, the computer readable code being configured such that, on execution, the computer readable code performs a method of operating a terminal device, the method comprising:
operating the terminal device in a connected state with respect to the communication network; and
receiving a first signal from a first radio access node in the communication network indicating that the connected state is to be suspended, the first signal comprising information for use in determining a first key for encrypting data to be sent between the terminal device and one of the first radio access node and another radio access node in the communication network if the connected state is resumed, the information for use in determining the first key for encrypting data comprising a Next Hop Chaining Counter (NCC) value and the first signal further comprising an identifier for the terminal device to be used by the terminal device when requesting the resumption of the connected state.

12. A terminal device, the terminal device comprising a processor and a memory, the memory containing instructions executable by the processor whereby the terminal device is configured to:
operate in a connected state with respect to the communication network; and
receive a first signal from a first radio access node in the communication network indicating that the connected state is to be suspended, the first signal comprising information for use in determining a first key for encrypting data to be sent between the terminal device and the first radio access node or another radio access node in the communication network if the connected state is resumed, the information for use in determining the first key for encrypting data comprising a Next Hop Chaining Counter (NCC) value and the first signal further comprising an identifier for the terminal device to be used by the terminal device when requesting the resumption of the connected state.

13. The terminal device as defined in claim 12, wherein the terminal device is further configured to, on receipt of the first signal:
store context information relating to the connected state with the communication network;
store the received information for use in determining the first key for encrypting data; and
switch the terminal device into one of an idle and suspended state with respect to the communication network.

14. The terminal device as defined in claim 12, wherein the terminal device is further configured to:
determine the first key for encrypting data to be sent on resumption of the connected state using the information in the first signal.

15. The terminal device as defined in claim 14, wherein the terminal device is operative to determine the first key for encrypting data by:
using the information in the first signal to determine whether the first key is to be determined from a second key that was previously used by the terminal device in encrypting data sent between the terminal device and the first radio access node.

16. The terminal device as defined in claim 12, wherein in the event that the connected state is to be resumed with the first radio access node, the first key comprises a key that was previously used by the terminal device in encrypting data sent between the terminal device and the first radio access node.

17. The terminal device as defined in claim 12, wherein the terminal device is further configured to:
send a second signal to one of the first radio access node and another radio access node in the communication network to request the resumption of the connected state.

18. The terminal device as defined in claim 17, wherein the second signal further comprises data to be sent from the terminal device to the communication network, wherein the data is encrypted using the first key.

19. The terminal device as defined in claim 18, wherein the terminal device is configured to encrypt the data using the first key according to a security algorithm configuration previously used with the first radio access node.

20. The terminal device as defined in claim 17, wherein the terminal device is further configured to:
receive a third signal from the one of the first radio access node and the another radio access node indicating that one of the connected state has been resumed and that an error occurred in resuming the connected state.

21. The terminal device as defined in claim 12, wherein the connected state is a radio resource control (RRC) connected state.

22. A first radio access node for use in a communication network, the first radio access node comprising a processor and a memory, the memory containing instructions executable by the processor whereby the first radio access node is configured to:
send a first signal to a terminal device that is in a connected state with respect to the communication network, the first signal indicating that the connected state is to be suspended, the first signal comprising information for use by the terminal device in determining a first key for encrypting data to be sent between the terminal device and one of the first radio access node and another radio access node in the communication network if the connected state is resumed, the information for use in determining the first key for encrypting data comprising a Next Hop Chaining Counter (NCC) value and the first signal further comprising an identifier for the terminal device to be used by the terminal device when requesting the resumption of the connected state.

23. The first radio access node as defined in claim 22, wherein the first radio access node is further configured to:
receive a second signal from the terminal device to request the resumption of the connected state.

24. The first radio access node as defined in claim 23, wherein the second signal further comprises encrypted data.

25. The first radio access node as defined in claim 24, wherein the first radio access node is further configured to:
   attempt to decrypt the encrypted data using the first key.

26. The first radio access node as defined in claim 23, wherein the first radio access node is further configured to:
   send a third signal to the terminal device indicating one of:
      (a) that the connected state has been resumed; and
      (b) that an error occurred in resuming the connected state.

27. The first radio access node as defined in claim 23, wherein the first radio access node is further operative to:
   determine the first key for encrypting data on resumption of the connected state with the terminal device.

28. The first radio access node as defined in claim 27, wherein the first radio access node is operative to determine the first key for encrypting data by:
   determining whether the first key is to be determined from a second key that was previously used in encrypting data sent between the first radio access node and the terminal device.

29. The first radio access node as defined in claim 27, wherein the first key comprises a key that was previously used for encrypting data sent between the terminal device and the first radio access node.

30. A first radio access node as defined in claim 22, wherein the connected state is a radio resource control (RRC) connected state.

* * * * *

UNITED STATES PATENT AND TRADEMARK OFFICE
CERTIFICATE OF CORRECTION

PATENT NO. : 10,805,795 B2
APPLICATION NO. : 15/759087
DATED : October 13, 2020
INVENTOR(S) : Ohlsson et al.

Page 1 of 1

It is certified that error appears in the above-identified patent and that said Letters Patent is hereby corrected as shown below:

In the Specification

In Column 13, Line 16, delete "will be have" and insert -- will have --, therefor.

In Column 18, Line 22, delete "terminal device 32" and insert -- terminal device 42 --, therefor.

In the Claims

In Column 29, Line 26, in Claim 30, delete "A first" and insert -- The first --, therefor.

Signed and Sealed this
Sixteenth Day of March, 2021

Drew Hirshfeld
*Performing the Functions and Duties of the
Under Secretary of Commerce for Intellectual Property and
Director of the United States Patent and Trademark Office*